US010320750B1

(12) United States Patent
Brandwine et al.

(10) Patent No.: US 10,320,750 B1
(45) Date of Patent: Jun. 11, 2019

(54) SOURCE SPECIFIC NETWORK SCANNING IN A DISTRIBUTED ENVIRONMENT

(71) Applicant: Amazon Technologies, Inc., Seattle, WA (US)

(72) Inventors: Eric Jason Brandwine, Haymarket, VA (US); Alexander Robin Gordon Lucas, Cheltenham (GB); Robert Eric Fitzgerald, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 81 days.

(21) Appl. No.: 15/085,257

(22) Filed: Mar. 30, 2016

(51) Int. Cl.
*H04L 29/06* (2006.01)

(52) U.S. Cl.
CPC ...... *H04L 63/0272* (2013.01); *H04L 63/0428* (2013.01)

(58) Field of Classification Search
USPC .......................................................... 726/15
See application file for complete search history.

(56) References Cited

U.S. PATENT DOCUMENTS

| | | | |
|---|---|---|---|
| 7,016,351 B1 * | 3/2006 | Farinacci | H04L 45/00 370/312 |
| 7,209,473 B1 * | 4/2007 | Mohaban | H04L 41/0213 370/352 |
| 7,257,689 B1 | 8/2007 | Baird | |
| 7,616,579 B2 * | 11/2009 | Slattery | H04L 41/5035 370/241 |
| 7,840,670 B2 * | 11/2010 | Hedayat | H04L 43/50 370/243 |
| 8,238,834 B1 * | 8/2012 | Bharghavan | H04W 24/06 379/1.01 |
| 8,549,641 B2 | 10/2013 | Jakobsson | |
| 8,931,107 B1 | 1/2015 | Brandwine | |
| 9,032,531 B1 | 5/2015 | Scorvo et al. | |
| 9,189,627 B1 | 11/2015 | Islam | |
| 9,462,013 B1 | 10/2016 | Boss et al. | |
| 9,501,345 B1 | 11/2016 | Lietz et al. | |
| 9,521,053 B1 * | 12/2016 | Chen | H04L 43/08 |
| 9,565,204 B2 | 2/2017 | Chesla | |
| 9,609,399 B2 | 3/2017 | Krishnamurthy et al. | |
| 2001/0013105 A1 * | 8/2001 | Kang | H04L 43/50 714/43 |
| 2003/0084321 A1 | 5/2003 | Tarquini et al. | |

(Continued)

OTHER PUBLICATIONS

Arpaci et al. "Log-structured File Systems," Operating Systems Version 0.91, www.ostep.org, 2014, 15 pages.

(Continued)

*Primary Examiner* — Taghi T Arani
*Assistant Examiner* — Badri Champakesan
(74) *Attorney, Agent, or Firm* — Davis Wright Tremaine LLP

(57) ABSTRACT

Customers of a computing resource service provider may operate one or more computing resources, provided by the computing resource service provider, within a virtual network. The customers may request network scans of the computing resources with the virtual network. Scanning packets may be generated and encapsulated to ensure delivery to an appropriate destination within the virtual network. The information in the scanning packet may appear to be generated by a source within the virtual network.

20 Claims, 11 Drawing Sheets

(56) References Cited

U.S. PATENT DOCUMENTS

| | | |
|---|---|---|
| 2003/0188189 A1 | 10/2003 | Desai et al. |
| 2003/0204619 A1 | 10/2003 | Bays |
| 2004/0049693 A1 | 3/2004 | Douglas |
| 2004/0064713 A1 | 4/2004 | Yadav |
| 2004/0250169 A1 | 12/2004 | Takemori et al. |
| 2005/0265331 A1 | 12/2005 | Stolfo |
| 2005/0289649 A1 | 12/2005 | Mitomo et al. |
| 2006/0010289 A1 | 1/2006 | Takeuchi et al. |
| 2006/0053490 A1 | 3/2006 | Herz et al. |
| 2007/0263553 A1* | 11/2007 | Bharali ............... H04L 45/02 370/254 |
| 2007/0288247 A1 | 12/2007 | Mackay |
| 2008/0189793 A1 | 8/2008 | Kirkup et al. |
| 2009/0007100 A1 | 1/2009 | Field et al. |
| 2009/0070283 A1 | 3/2009 | Kang et al. |
| 2009/0125573 A1 | 5/2009 | Hardy |
| 2010/0031093 A1* | 2/2010 | Sun .................... G06F 21/552 714/45 |
| 2010/0075751 A1* | 3/2010 | Garvey ............... G06Q 10/06 463/30 |
| 2010/0161960 A1* | 6/2010 | Sadasivan .......... H04L 63/0272 713/152 |
| 2011/0060725 A1 | 3/2011 | Lunde |
| 2012/0260342 A1 | 10/2012 | Dube et al. |
| 2013/0024567 A1 | 1/2013 | Roxburgh et al. |
| 2013/0128751 A1* | 5/2013 | Keesara ............. H04L 43/0811 370/248 |
| 2013/0212709 A1 | 8/2013 | Tucker |
| 2014/0029449 A1* | 1/2014 | Xu ....................... H04L 43/10 370/252 |
| 2014/0133354 A1* | 5/2014 | Scharf ................. H04L 45/42 370/254 |
| 2014/0237599 A1 | 8/2014 | Gertner et al. |
| 2014/0245423 A1 | 8/2014 | Lee |
| 2014/0283085 A1 | 9/2014 | Maestas |
| 2014/0331304 A1 | 11/2014 | Wong |
| 2014/0351810 A1 | 11/2014 | Pratt et al. |
| 2015/0043578 A1* | 2/2015 | Fidler ................ H04L 12/4633 370/390 |
| 2015/0081863 A1* | 3/2015 | Garg ...................... H04L 41/00 709/223 |
| 2015/0207813 A1 | 7/2015 | Reybok et al. |
| 2015/0222656 A1 | 8/2015 | Haugsnes |
| 2015/0264084 A1 | 9/2015 | Kashyap et al. |
| 2015/0355957 A1 | 12/2015 | Steiner et al. |
| 2015/0381641 A1 | 12/2015 | Cabrera et al. |
| 2016/0119365 A1 | 4/2016 | Barel |
| 2016/0191547 A1 | 6/2016 | Zafar et al. |
| 2016/0255054 A1* | 9/2016 | Wan .................... H04L 63/0414 713/160 |
| 2016/0306751 A1 | 10/2016 | Amarendran et al. |
| 2017/0063927 A1* | 3/2017 | Schultz ................ H04L 63/20 |
| 2017/0099195 A1* | 4/2017 | Raney ................ H04L 43/028 |
| 2017/0109310 A1* | 4/2017 | Takahashi ............ G06F 13/10 |
| 2017/0155673 A1 | 6/2017 | Desai et al. |
| 2017/0171231 A1 | 6/2017 | Reybok, Jr. et al. |
| 2017/0279847 A1 | 9/2017 | Dasgupta et al. |

OTHER PUBLICATIONS

Rosenblum et al., "The Design and Implementation of a Log-Structured File System," University of California at Berkley, ACM Transactions on Computer Systems vol./Issue 10(1):26-52, Feb. 1992.

Check Point, "Firewall Administration Guide," Version R77, Dec. 6, 2015, found at http://dl3.checkpoint.com/paid/79/7916511f80908c3056af526bae304602/CP_R77_Firewall_AdminGuide.pdf?HashKey=1511120649_66bcd3456845e431d368a251b8d73769&xtn=. pdf., 13 pages.

* cited by examiner

SOURCE SPECIFIC NETWORK SCANNING IN A DISTRIBUTED ENVIRONMENT

CROSS REFERENCE TO RELATED APPLICATIONS

This application incorporates by reference for all purposes the full disclosure of co-pending U.S. patent application Ser. No. 15/085,271, filed concurrently herewith, entitled "CORRELATING THREAT INFORMATION ACROSS MULTIPLE LEVELS OF DISTRIBUTED COMPUTING SYSTEMS," co-pending U.S. patent application Ser. No. 15/085,554, filed concurrently herewith, entitled "CORRELATING THREAT INFORMATION ACROSS SOURCES OF DISTRIBUTED COMPUTING SYSTEMS," co-pending U.S. patent application Ser. No. 15/085,585, filed concurrently herewith, entitled "BLOCK-LEVEL FORENSICS FOR DISTRIBUTED COMPUTING SYSTEMS," co-pending U.S. patent application Ser. No. 15/085,608, filed concurrently herewith, entitled "HOST-BASED FIREWALL FOR DISTRIBUTED COMPUTER SYSTEMS," and co-pending U.S. patent application Ser. No. 15/085,708, filed concurrently herewith, entitled "TRANSPARENT VOLUME BASED INTRUSION DETECTION."

BACKGROUND

A data center is a facility that houses computer systems and various networking, storage, and other related components. Data centers may, for example, provide computing services to businesses and individuals as a remote computing service or provide "software as a service" (e.g., cloud computing). To facilitate the utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner.

In a large distributed computing system (e.g., multiple distributed data centers) of a computing resource service provider, various customers, users, services, and resources of the computing resource service provider are in frequent communication with each other. Keeping the system secure becomes more challenging as applications are updated and as the complexity and usage of the system increases. In such distributed computing systems, it can be difficult to identify the vulnerabilities of the system. Furthermore, it can also be difficult to isolate and troubleshoot issues with the system, and even when issues are identified, reliably securing the system may be challenging. Additionally, many conventional systems rely upon manual mitigation of such vulnerabilities. The complexity and distribution of computing resources in these environments may make it difficult to collect and analyze log information generated by the computing resources.

BRIEF DESCRIPTION OF THE DRAWINGS

Various techniques will be described with reference to the drawings, in which.

DETAILED DESCRIPTION

Figure 1:
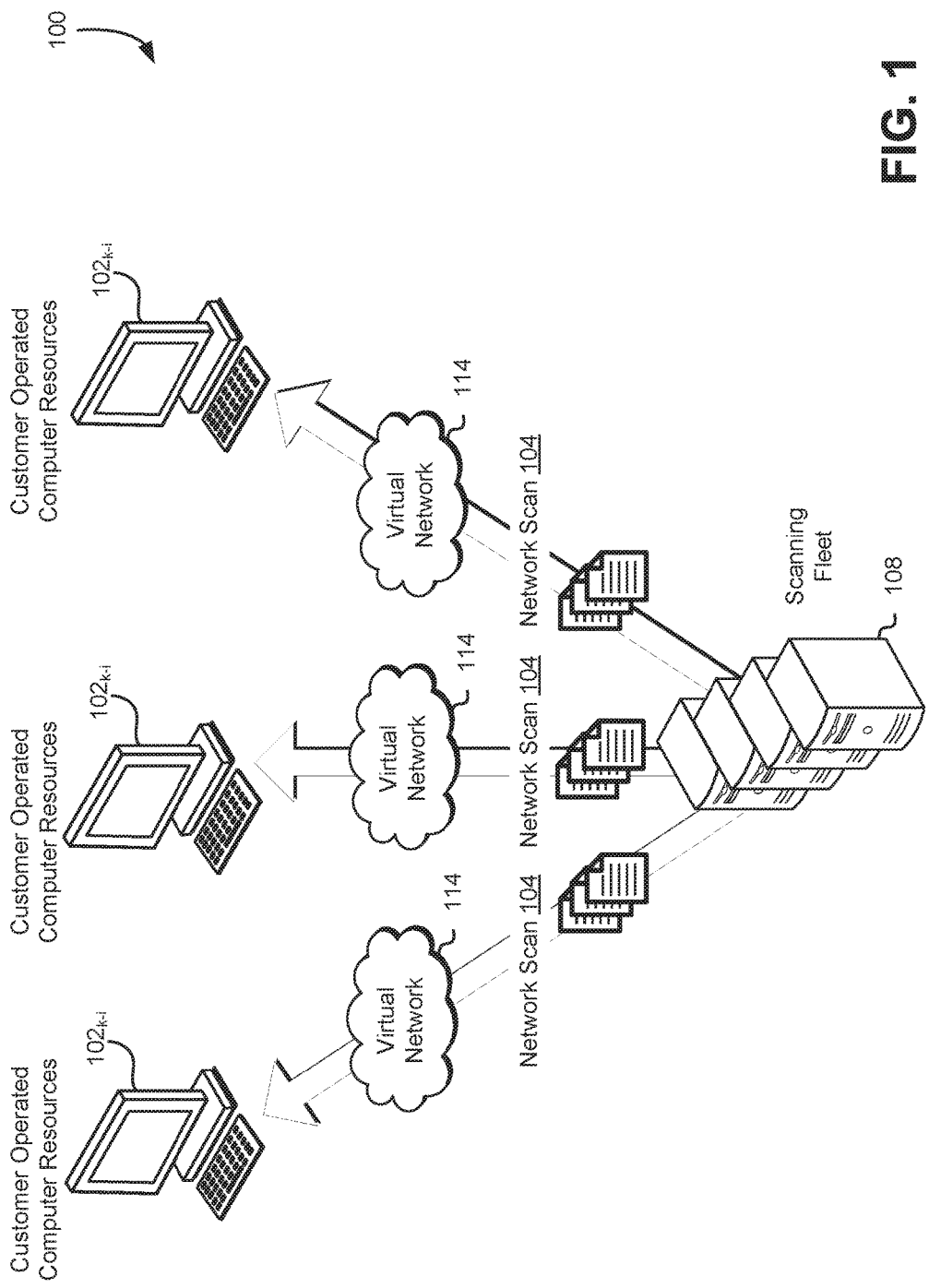
FIG. 1 illustrates an environment in which a scanning fleet may perform a variety of network scans on various networks in accordance with at least one embodiment.

In various examples described below, network scans are performed to determine and test for vulnerabilities in computer networks. Specifically, a customer may operate a private network, such as a virtual private network or other network, using computing resources provided by a computing resources service provider. The customer's private network may be connected to one or more other networks through a gateway, such as an internet gateway or other networking device. The customer's private network may also include firewalls and other security devices that protect computing resources operated by the customer from attacks. To test for vulnerabilities and computing resources not protected by the firewalls and other security devices, the customer may execute various network scans. However, different sources of the network scan (e.g., Internet Protocol addresses assigned to the packets of the network scan) may yield different results. For example, packets sourced from a public network may be handled differently (e.g., blocked or denied) than packets sourced from inside the customer's private network. The computing resources service provider may provide the customer with various mechanisms described herein to execute network scans from within the customer's private network.

In one such example, various endpoints are attached to the customer's private network to distribute packets of one or more network scans to the customer's private network. The endpoints may modify or otherwise alter the Internet Protocol (IP) packets included in the one or more network scans such that the IP addresses associated with the IP packets of the one or more network scans appear originate from within the customer's private network. The endpoints may be virtual devices that enable a private connection between computing resources inside the customer's private network and computing resources outside the customer's private network via encapsulation of the network traffic between the computing resources. The encapsulated network traffic (e.g., encapsulated IP packets) may include metadata or other information identifying the source of the IP packet, the customer's private network, and an endpoint connected to the customer's private network. In this manner, when computing resources within the customer's private network receive packets of a particular network scan it may appear to the computing resources as if the packets originated from within the customer's private network. Responses to the network scan may be received at the endpoint and transmitted to the scanning instance responsible for generating the packets based at least in part on information included in the encapsulated packets.

In another example, a network interface trunk is used to source packets of a network scan from directly within the customer's private network. A network interface trunk may be a virtual device that consumes a network address much like a network interface or network adapter but is capable of consuming a plurality of network addresses (e.g., 1,000 to 10,000 network addresses) simultaneously. The customer may assign a specific network address from the customer's private network to the network interface trunk. The network interface trunk may then use the specific network address assigned by the customer when sourcing network traffic for one or more network scans. For example, the network interface trunk may include the specific network address in an encapsulated packet directed to the customer's private network. Including the specific network address in the encapsulated packet may cause computing resources within the customer's private network to respond as if the encapsulated packet was transmitted from the specific network address. The encapsulated packet may further include metadata that enables responses from computing resources within the customer's private network to be directed back to the network interface trunk.

Response to the network scanning techniques described above may be collected, organized, and presented to the customer. The information presented to the customer may indicate vulnerabilities in the customer's private network from sources outside as well as within the customer's private network, e.g., a web server operated by the customer may only expose ports 80 and 443 to the Internet but may expose all ports to traffic sourced from within the customer's private network. Outside (external) sources may include network traffic associated with an address (e.g., IP address) or other identifying information not associated with the customer's private network, e.g., network traffic associated with a public IP address on the internet. Internal sources may include network traffic associated with an address (e.g., IP address) or other identifying information associated with the customer's private network, e.g., network traffic associated with an IP address and subnetwork of the customer's private network, such as a virtual machine connected to the customer's private network and consuming an IP address thereof.

In the preceding and following descriptions, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an environment 100 in which network scans 104 may be executed on one or more networks in accordance with an embodiment. The network scans 104 may be performed by one or more computer systems included in a scanning fleet 108. For example, the scanning fleet 108 includes a set of physical server computer systems executing virtual devices or other applications that generate network traffic that scans a virtual network, such as virtual networks 114 illustrated in FIG. 1. The scanning fleet 108 may be operated by a computing resource service provider, described in greater detail below, and may scan networks for vulnerabilities on behalf of customers of the computing resource service provider. For example, the scanning fleet 108 may execute one or more port scanners, such as Network Mapper (Nmap) or other software applications designed to probe a server, host, computer system, or other device for open ports. This may be used by used by administrators, customers, users, or other entities to verify security policies of various networks. The scanning fleet 108 may execute a variety of different network scans 104 such as Transmission Control Protocol (TCP) scanning, Synchronizing (SYN) scanning, User Datagram Protocol (UDP) scanning, Acknowledge (ACK) scanning, Window scanning, and other suitable network scanning techniques.

The virtual networks 114 may include any suitable network such as a virtual network dedicated to a particular customer or set of networked computer systems. The virtual networks 114 may be logically isolated from other virtual networks 114, public networks, and other computer systems. Customers may be able to execute computing resources $102_{k-i}$, such as virtual machine instances, web servers, mail servers, databases, or other computing devices, within the virtual network 114. A computing resource assigned an address associated with the virtual network 114 may be considered within the virtual network 114 for the purposes of the present disclosure. For example, a network interface of a virtual machine instance may be assigned an IP address associated with the virtual network 114 and may be able to communicate with other computing resources $102_{k-i}$ within the virtual network 114 through the network interface based at least in part on the IP address assigned to the virtual machine. You can configure your virtual private cloud (VPC); you can select its IP address range, create subnetworks, and configure route tables, network gateways, and security settings. A subnetwork is a range of IP addresses in your VPC. The virtual network 114 may include various subnetworks. For example, a public subnetwork is to be used for computing resources $102_{k-i}$ that must be connected to the Internet, and a private subnetwork is to be used for computing resources $102_{k-i}$ that are not to be connected to the Internet.

The customer may request that the scanning fleet 108 perform various network scans 104. The customer may request a network scan for a variety of reasons. For example, various government and/or organizational compliance regimes may require periodic or aperiodic network scans 104 to detect vulnerabilities. In addition, it may be difficult or impractical for customers to implement computing resources to execute a network scan 104. The scanning fleet 108 operated by the computing resource service provider may, using various techniques described below, efficiently execute multiple network scans 104 of a plurality of virtual networks 114. Additionally, the network traffic generated by the scanning fleet 108 during the network scans 104 may be modified (e.g., encapsulated) so that the computing resources $102_{k-i}$ within the virtual network 114 respond to the network scan as if the network traffic originated from within the virtual network 114 (e.g., the scanning fleet or component thereof is assigned an IP address of the virtual network 114). The customer can request that scanning packets appear to originate from a particular IP address, from a particular range of IP addresses, a particular subnetwork of the customer virtual network, or from any other location within the customer's virtual network. The computing resource service provider or component thereof, such as the security service, may also select the particular IP address on behalf of the customer. The scanning packet may include a variety of network traffic including IP packets or other traffic that may cause a response to be generated by a destination receiving the traffic. In one example, the scanning packets are a set of IP packets of a network scan, where response to the scanning packets include information from the destination used for generating network scan information. Furthermore, IP addresses included in the IP headers of the scanning packets may include an IP address associated with the customer's virtual private network such that the scanning packets appear to originate from within the customer's virtual private network. The scanning fleet 108 may implement Data Plane Development Kit (DPDK) to execute high speed data packet networking applications that generate IP packets included in the network scans 104. In this manner the scanning fleet 108 may rapidly and efficiently generate a large number of IP packets to distribute to the plurality of virtual networks 114 in response to requests from customers operating the plurality of virtual networks 114.

The plurality of virtual networks 114 as illustrated by FIG. 1 may be instantiated by any number of customers. In addition, the plurality of virtual networks 114 may be isolated from one another and may include multiple network name spaces (e.g., overlapping IP address spaces). Therefore, the network scans 104 and/or network traffic included in the network scans 104 may require additional information to be included such that the network scan 104 is directed to the appropriate virtual network 114. In some embodiments, an endpoint, described in greater detail below, is provided by the customer to enable traffic to be directed to the endpoint associated with the customer's virtual network such that the network scan 104 is directed to the appropriate virtual network 114. The endpoint may be attached to an edge of the customer's private network (e.g., may be connected to both a public network and the customer's virtual network). In yet other embodiments, a network interface trunk, described in greater detail below, is assigned an address within the customer's virtual network so that network scans 104 may be associated with the address within the customer's virtual network. The network interface trunk may be assigned a plurality of network addresses so that the network interface trunk or software application connected to the network interface trunk may direct network scans 104 to the plurality of virtual networks 114.

Figure 2:
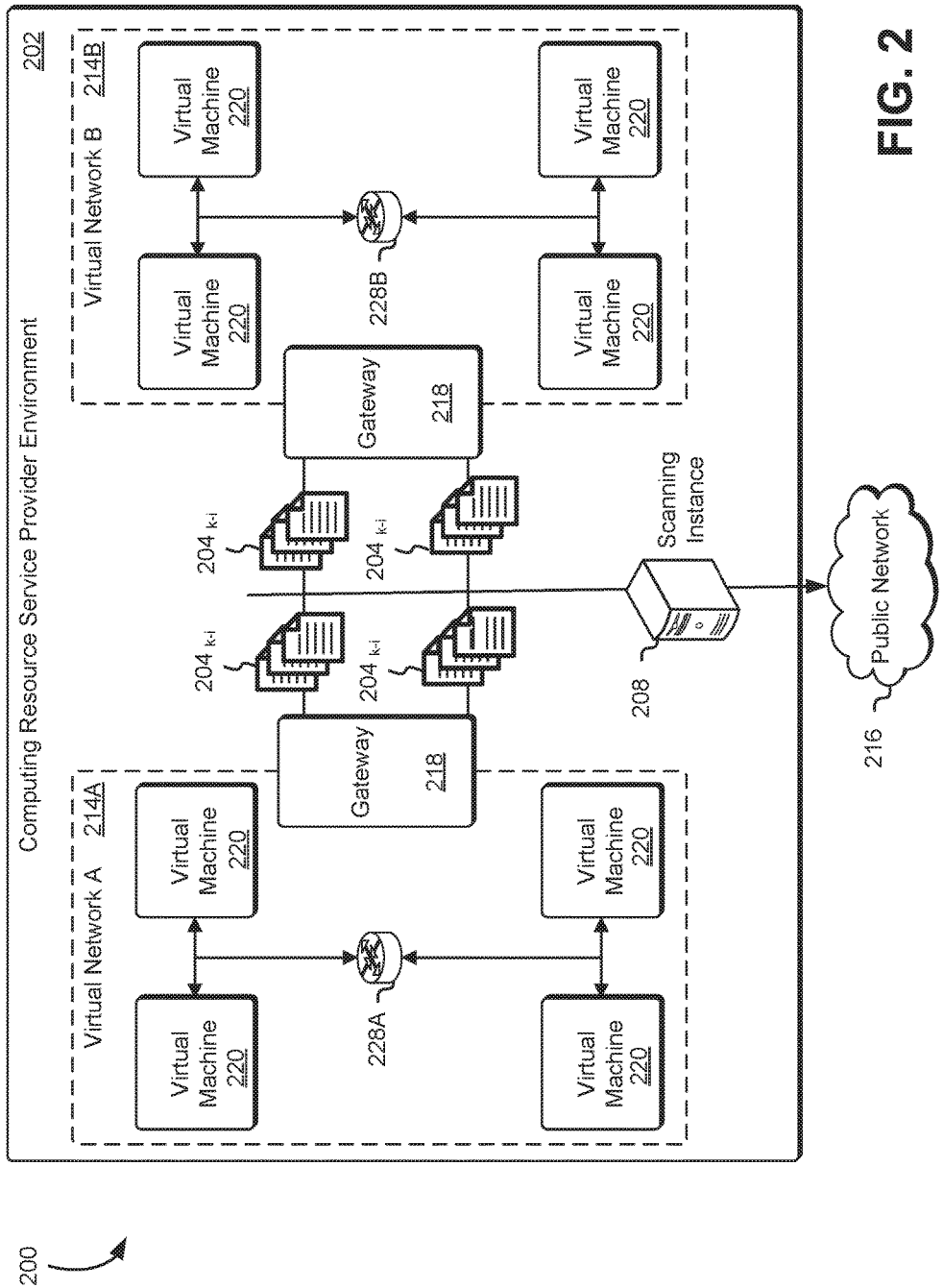
FIG. 2 illustrates an environment in which a scanning instance may execute a set of network scans from different network locations in accordance with at least one embodiment.

FIG. 2 illustrates an aspect of an environment 200 in which an embodiment may be practiced. Specifically, FIG. 2 depicts the generation of network traffic (e.g., IP packets) as part of a network scan $204_{k-i}$ executed by a scanning instance 208. The environment 200 may include a gateway 218 that receives network traffic directed to computing systems and/or computing resources, such as virtual machines 220, and provides connectivity with other networks, such as the public network 216, which may use different protocols. The gateway 218 may contain computing devices such as protocol translators, impedance matching devices, rate converters, fault isolators, or signal translators as necessary to provide system interoperability, such as performing protocol conversion to enable computing devices to communicate between networks.

The public network 216 may be any suitable network such as the Internet or a customer's public network. Various computing systems or computing devices (e.g., virtual machine instances 220) may be placed on the servers according to a rack diversity constraint, where the sets of racks may be localized by different virtual networks 214A and 214B. In addition, various computing systems or computing devices executing on the servers at different rack locations may be connected through virtual networks 214A and 214B as described above. The network scans $204_{k-i}$ may be directed to different computing systems or computing devices executed by the servers in the sets of racks on different virtual networks 214A and 214B. The scanning instance may be a computing system of one or more computing systems included in a scanning fleet as described above in conjunction with FIG. 1.

In an embodiment, the scanning instance 208 directs the network scans $204_{k-i}$ to an endpoint 228A-228B within the virtual network 214A and 214B such as the virtual machines 220. The endpoint 228A-228B may be a computing system or computing device (e.g., virtual machine instances 220) within the virtual network 214A and 214B that is used to create a private connection between the scanning instance 208 and the endpoint 228A-228B. As a result of the private connection between the scanning instance 208 and the endpoint 228A-228B the network scans $204_{k-i}$ may be received at various other computing systems or computing devices of the virtual network 214A and 214B as if the scanning instance 208 has transmitted the network scan $204_{k-i}$ from within the virtual network 214A and 214B. For example, the scanning instance 208 may generate a set of Internet Protocol version 4 (IPv4) network packets directed to one or more computing resources within the virtual networks 214A and 214B. The scanning instance 208 or other computing device may then encapsulate the IPv4 network packets in Internet Protocol version 6 (IPv6) network packets directed to one or more endpoints 228A-228B within the virtual networks 214A and 214B. In various embodiments, IPv4 packets are encapsulated in IPv6 packets based at least in part on a protocol utilized by the virtual network 214A and 214B.

Other encapsulation techniques may be used in accordance with the present disclosure. For example, additional headers (e.g., IPv4 headers) may be attached or appended to the scanning packets so that the scanning packets may be directed to a customer's virtual network over one or more networks operated by the computing resource service provider. In addition, IPv6 packets may be encapsulated in IPv4 packets. Multiple headers may be "stacked" or otherwise included in the scanning packet to enable the scanning packet to traverse one or more physical networks to reach the customer's virtual network. For example, a first header with information for routing across a physical network and a second header with information for routing across a customer's virtual network may be added to the scanning packet that includes information for routing across the customer virtual network. This routing information may be maintained by one or more computer systems of the computing resource service provider and used to route response packets back to the scanning instance responsible for generating the network scans $204_{k-i}$ or other destination responsible for determining a result of the network scans $204_{k-i}$.

The IPv6 network packets may include metadata or other information indicating a customer associated with the virtual networks 214A and 214B, a particular virtual network, a particular endpoint 228A-228B, the scanning instance 208, or any other information suitable for executing network scans $304_{k-i}$ of the virtual networks 214A and 214B. Once received at the endpoint 228A-228B, the IPv6 network packets may be de-encapsulated to obtain the IPv4 network packet. The IPv4 network packet may then be transmitted across the virtual network 214A and 214B based at least in part on an IP address (e.g., an IP address assigned to a virtual machine instance within the virtual network 214A and 214B) included in the IPv4 network packet. Responses to the IPv4 packets may be generated by computing resources within the virtual networks 214A and 214B and returned to the endpoint 228A-228B, the endpoint 228A-228B may then encapsulate the responses based at least in part on the metadata included in the IPv6 network packets and transmit the encapsulated responses to the scanning instance 208.

The sets of racks may be physical hardware configured to host one or more servers or, in some embodiments, may simply be logical groupings of the one or more servers. Examples of logical groupings other than by rack may include servers grouped together based on data center location, servers in different fault isolation groups (i.e., logical divisions of resources such that failure of one fault zone may not affect servers in the other zones, e.g., grouped by geographic regions, data centers, hard drive clusters, backup generators, etc.), servers grouped together based on performance characteristics (e.g., throughput, input/output operations per second, etc.), and so on. The servers in a rack may be members of a particular network. In some implementations, multiple racks of servers may be members of the same network.

The virtual networks 214A and 214B may be data communication pathways between one or more electronic devices. The virtual networks 214A and 214B may be wired or wireless networks and may use any of a variety of communications protocols for organizing their network traffic. The virtual networks 214A and 214B may allow the sharing of files, data, and other types of information between the one or more electronic devices accessible through the data communication pathways. Each of the virtual networks 214A and 214B may be associated with a router, such as an aggregation router. Routers may be networking devices that forward packets between computer networks, such as between the virtual networks 214A and 214B. The computing resources illustrated in FIG. 2 may be virtualized by one or more server computer as described in greater detail below. In this manner, the virtualized computing resources may share the same physical resources such as server computers and physical network connections.

Figure 3:
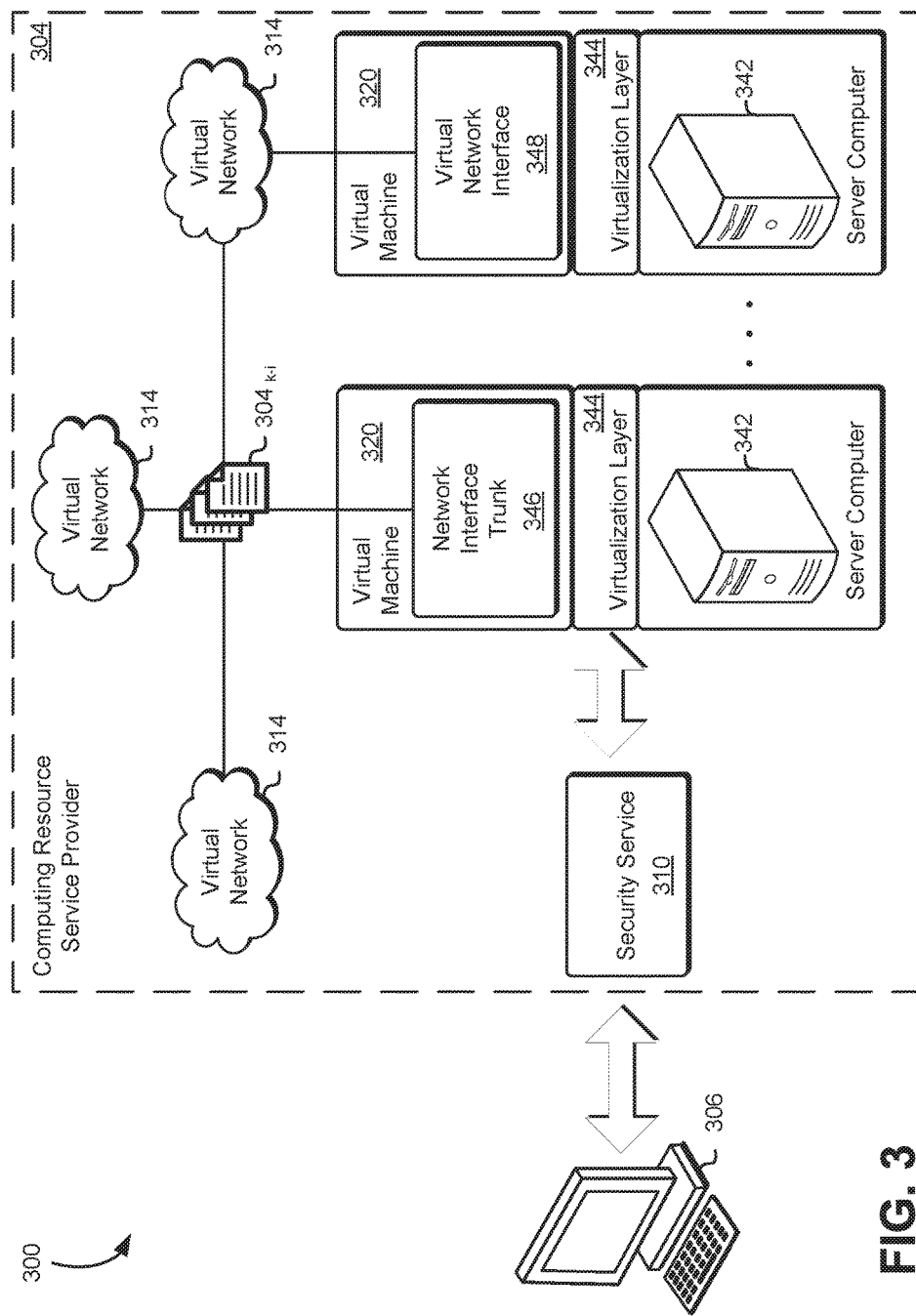
FIG. 3 illustrates an environment in which a network interface trunk may execute a set of network scans from different network locations in accordance with at least one embodiment.

FIG. 3 illustrates an environment 300 in which a security service 310 of a computing resource service provider 304 may configure computing resources to execute network scans $304_{k-i}$ in accordance with at least one embodiment. The security service 310, which may be implemented by physical hardware, is used by the computing resource service provider 304 to provide detection and mitigation of security threats and vulnerabilities in customer networks as described above. The security service 310 may include a group of computing systems, such as the server computers 342 described in detail below, that provide customers 306 with an interface for executing various network scans $304_{k-i}$. The server computer 342 may be any device or equipment configured to execute instructions for performing data computation, manipulation, or storage tasks, such as a computer or a server. A server computer 342 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications, or data transfer protocol. The server computer 342 may also include storage devices such as storage disks and tapes, networking equipment, and the like.

A virtualization layer 344 may include a bare metal hypervisor or a hosted hypervisor. The virtualization layer 344, executing on the server computers 342, enables the physical hardware to be used to provide computational resources upon which one or more virtual machines 320 or other computing resources such as a network interface trunk 346 may operate. For example, the virtualization layer 344 enables a particular virtual machine to access physical hardware on the server computer 342 through virtual device drivers or other executable code. For example, the virtualization layer 344 may enable the virtual machine 320 to receive packets associated with the network scan $304_{k-i}$ through a virtual network interface 348 or similar device driver. The virtualization layer 344 may include a hypervisor or virtualization software and/or hardware. The virtualization layer 344 may also include an instance of an operating system dedicated to administering the network interface trunk 346 or component thereof running on the server computer 342. Each virtualization layer 344 may include its own networking software stack, responsible for communication with other virtualization layers 344 and, at least in some embodiments, also responsible for implementing network connectivity between the server computers 342 or components thereof running and virtual machines 320 instantiated on other server computers 342.

Furthermore, the server computer 342 may host multiple virtualization layers 344 of the same or different types on the same server computer 342 as well as virtual machines 320 and network interface trunks 346 of the same or different types. For example, a server computer system 342 may host a first virtual machine 320 of a first virtual network and may host a second virtual machine 320 that is connected to a second virtual network. The virtualization layer 344 may be any device, software, or firmware used for providing a virtual computing platform and/or virtualized computing resources for the virtual machines 320 and/or component thereof. The virtual computing platform may include various virtual computer components, such as one or more virtual CPUs, virtual memory, and the like. The virtual machines 320 may be provided to the customers 306 or other services of the service provider 304, and the customers 306 may utilize the virtual machines 320 to implement applications and operate virtual networks. Further, the computing resource service provider 304 may use one or more of its own virtual machines 320 for supporting execution of applications and providing computing resources for such applications. For example, the computing resource service provider 304 may use one or more virtual machines 320 for supporting execution of the security service and scanning fleet for conducting network scans $304_{k-i}$ as described above.

Commands and other information may be included in an application program interface (API) call from the security service 310 to the virtualization layer 344. For example, the customer 306 may request a network scan through a console or other interface of the security service 310. In an embodiment, the request by the customer 306 may include one or more network addresses associated with the customer's virtual network. The one or more network addresses may enable the security service 310 or other computing resource, such as the network interface trunk 346, to generate network scans 304$_{k-i}$ utilizing the one or more network addresses associated with the customer's virtual network and, as a result, may cause the virtual machines 320 to respond to the network scans 304$_{k-i}$ as if the network scans 304$_{k-i}$ were generated and/or sourced from within the customer's virtual network. Once the one or more network addresses are assigned by the customer 306, the security service 310 may transmit an API call or other command to the virtualization layer 344 to cause the network interface trunk 346 to consume the one or more network addresses. In various embodiments, the customer 306 specifies a network address or range of network addresses the customer wants the network scans 304$_{k-i}$ to be sourced from.

Figure 4:
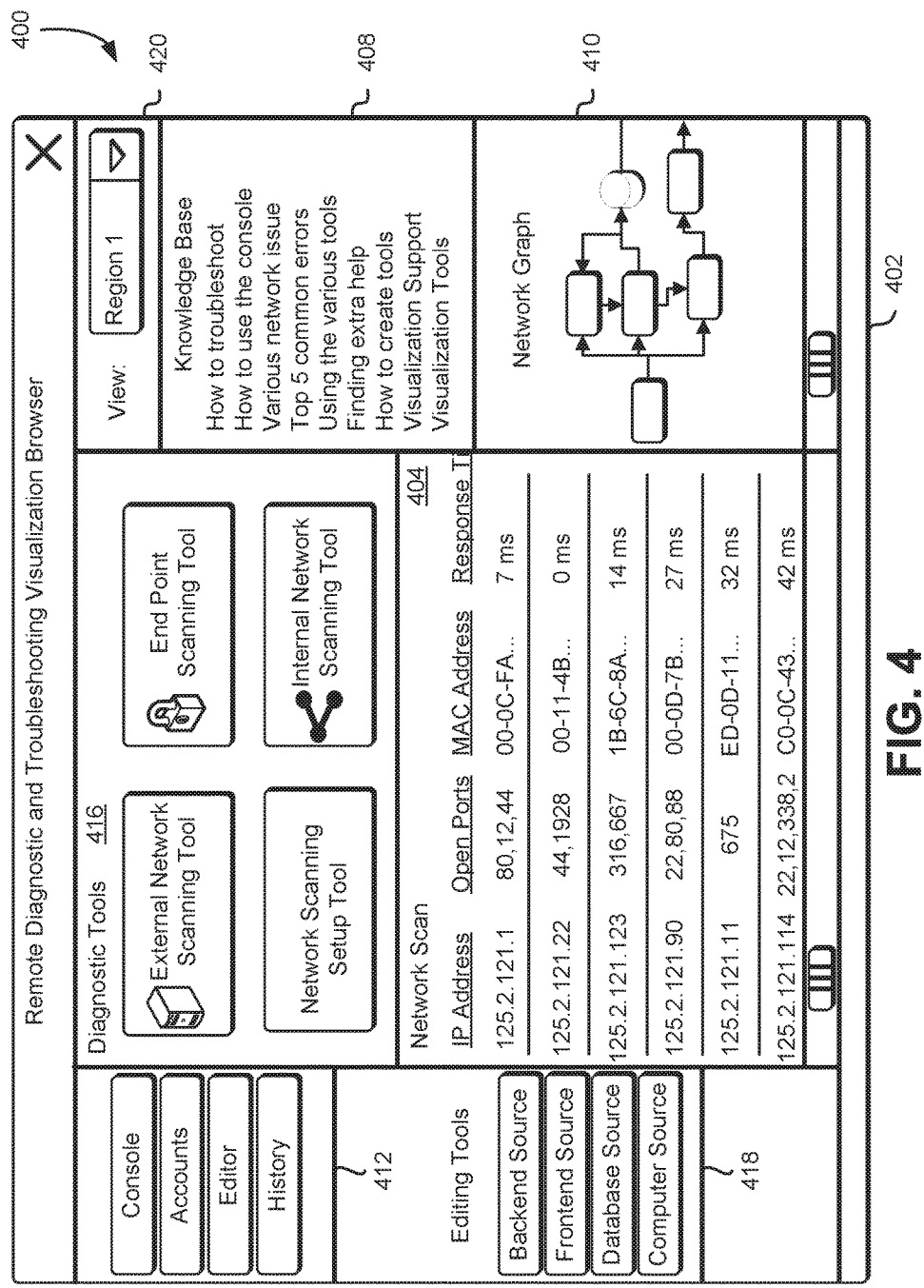
FIG. 4 illustrates an example environment where a remote diagnostic and troubleshooting visualization browser may be used to display results of a network scan in accordance with an embodiment.

FIG. 4 illustrates an example environment 400 where a remote diagnostic and troubleshooting visualization browser 402 may be used to display information collected during one or more network scans as described herein at least in connection with FIG. 1 and in accordance with at least one embodiment. The remote diagnostic and troubleshooting visualization browser 402 may be configured to enable a customer to troubleshoot issues associated with computing resources operated by the customer, receive recommendations associated with the customer's architecture, search a knowledge base for information related to the computing resources operated by the customer, view customer network scan data, generate customer network scan data, and generally diagnose and troubleshoot issues with the customer's virtual networks. The remote diagnostic and troubleshooting visualization browser 402 may be configured as a computer service such as a web service and may be provided as a service by the computing resource service provider as described herein at least in connection with FIGS. 1-3.

The remote diagnostic and troubleshooting visualization browser 402 may be provided as a user interface executed by an application, such as a web browser executing on a computer system operated by the customer, as well as other user interfaces that may be used to present computing resource and diagnostic analysis information to a customer and may, in some embodiments, be generated by the computing resource service provider and sent to the customer's display for rendering. In other embodiments, the customer's computing device may include functionality to generate some or all portions of the user interface. For example, the customer's web browser may include code for generating some of the graphics for rendering data received from the computing resource service provider. The service provider may receive the selection information from the customer's computing device and provide the requested information. The user interface may be generated or caused to be generated by a security service as described above at least in connection with FIG. 3.

The remote diagnostic and troubleshooting visualization browser 402 may include diagnostic tools 416 to perform various network scans as described herein and visualization of network scan data in the remote diagnostic and troubleshooting visualization browser 402. For example, the diagnostic tools 416 may include a graphical user interface element, such as the buttons illustrated in FIG. 4, where selection of the graphical user interface element may cause the security service to execute a particular network scan associated with the selected graphical user element. Such a diagnostic task, as described above, may be configured to generate, by a scanning fleet or instance thereof, network traffic corresponding to a network scan of a particular customer's virtual network.

The remote diagnostic and troubleshooting visualization browser 402 may produce the graphical representation of a network scan 404 based at least in part on a set of results obtained from one or more network scans of one or more virtual networks to be displayed in a display pane of the remote diagnostic and troubleshooting visualization browser 402. For example, the remote diagnostic and troubleshooting visualization browser 402 may, in response to a request from a customer, transmit an API call or other command to a scanning instance to execute a network scan. In various embodiments, the customer is prompted to provide additional information and/or configure additional resources to execute the network scan. The customer may be required to provide information corresponding to an endpoint, network address, or other information suitable for identifying the customer's virtual network. The graphical representation of a network scan may be displayed using tables, block diagrams, generated images, or visualization elements and may, in some embodiments, include one or more icons.

The remote diagnostic and troubleshooting visualization browser 402 may include a set of options 412 used to perform various functions in connection with the remote diagnostic and troubleshooting visualization browser 402. The set of options 412 may be a set of functions included in the remote diagnostic and troubleshooting visualization browser 402 that enables a customer to perform a variety of operations such as managing accounts, creating diagnostic tasks, and managing computing resources. The options 412 may be configured as graphical user interface elements of the remote diagnostic and troubleshooting visualization browser 402.

The account button may be configured to enable the customer to select particular customer accounts against which to perform diagnostic and troubleshooting operations. In various embodiments, the customer operating the remote diagnostic and troubleshooting visualization browser 402 is required to have, at a minimum, complete read permissions across all of the customer services and computing resources associated with the accounts against which the customer is attempting to perform diagnostic and troubleshooting operations. The editor button may be configured to enable the customer to create custom network scans in a task editor tab (not shown in FIG. 4 for simplicity). For example, the customer may create a custom network scan to scan a particular range of network addresses at a particular point in time.

In various embodiments, the customer is provided with resources to aid in the creation and editing of network scans. Once created, the customer may cause the network scans to be executed to detect vulnerabilities in the customer's network and save the network scans for later use. The network scans may be saved in such a manner that they are accessible to all customer accounts and/or all other customers of the computing resource service provider. The network scans may also be submitted to the computing resource service provider for review and approval and after review, if the network scans are found to be unique and of good quality, they may be published to all customers and used as a support tool.

The remote diagnostic and troubleshooting visualization browser 402 may further include a network graph 410. The network graph may be configured to provide information related to computing resource availability and computing resource impairments. This information may provide a set of data associated with systemic, operational, or maintenance events and the impact on customer operated computing resources. The information displayed in the network graph 410 may be generated automatically or in response to a customer executing a particular network scan. The remote diagnostic and troubleshooting visualization browser 402 may also include a knowledge base 408 which includes articles and provides access to curated content based at least in part on the information collected from customers of the computing resource service provider or generated by the computing resource service provider. The knowledge base 408 may include suggestions on remedial actions for specific computing resource issues or suggest relevant network scans that could detect vulnerabilities in the customer's virtual network. In addition, diagnostic tasks may suggest or recommend particular knowledge-based articles based at least in part on a result of the diagnostic task.

Customers while working on a specific issue associated with an account or account group may use the remote diagnostic and troubleshooting visualization browser 402 to provide the technical support service with additional information corresponding to the customer's virtual network. The customer may use editing tools 418 to edit network scans and/or sources associated with particular network scans. For example, the customer may use the editing tools 418 to edit endpoints and/or information associated with the endpoints such as tags associated with the endpoints.

Once a customer has established a connection to the security service through the remote diagnostic and troubleshooting visualization browser 402, the remote diagnostic and troubleshooting visualization browser 402 may automatically populate the customer's display with the information in various components of the remote diagnostic and troubleshooting visualization browser 402, such as the event viewer and knowledge base. The customer may also be able to choose a network scan to execute based at least in part on a recommendations section or search for one using relevant keywords (not shown in FIG. 4 for simplicity). For example, some network scans may provide an answer to issues directly (e.g., network connection issues) while other network scans may render views or other visualizations in the display plane (e.g., graphical representations of the network scan). As illustrated in FIG. 4, the network scan may return information such as the IP addresses of various computing resources on the customer's virtual network, one or more open ports of various computing resources, media access control (MAC) addresses of various computing resources, other unique identifiers of various computing resources, response times of various computing resources, and any other information obtained by the security service, scanning instance, or other computer system executing the network scan.

As an operation enabled by the remote diagnostic and troubleshooting visualization browser 402, the customer can view different regions from a drop down menu 420. The different regions may include different geographical regions or different logical regions within the same or different geographical regions. For example, different regions may include two or more separate virtual networks. Customers may navigate to a particular group using a graphical user interface element as illustrated in FIG. 4. Selection of a particular region may limit the network scans and generated views to information and operations specific to the region. In various embodiments, the customer uses or creates network scans to monitor the computing resources or regions associated with specific computing resources. The customer may use the remote diagnostic and troubleshooting visualization browser 402 to select a particular network scan for automated execution in response to a periodic or aperiodic trigger. For example, the customer may select a particular network scan to be executed daily, and the network scan may be configured to generate reports or other information for all accounts associated with the customer with more than one hour of activity. In another example, the customer may select a network scan to execute when the amount of free address space in a particular virtual network falls below 15 percent.

Figure 5:
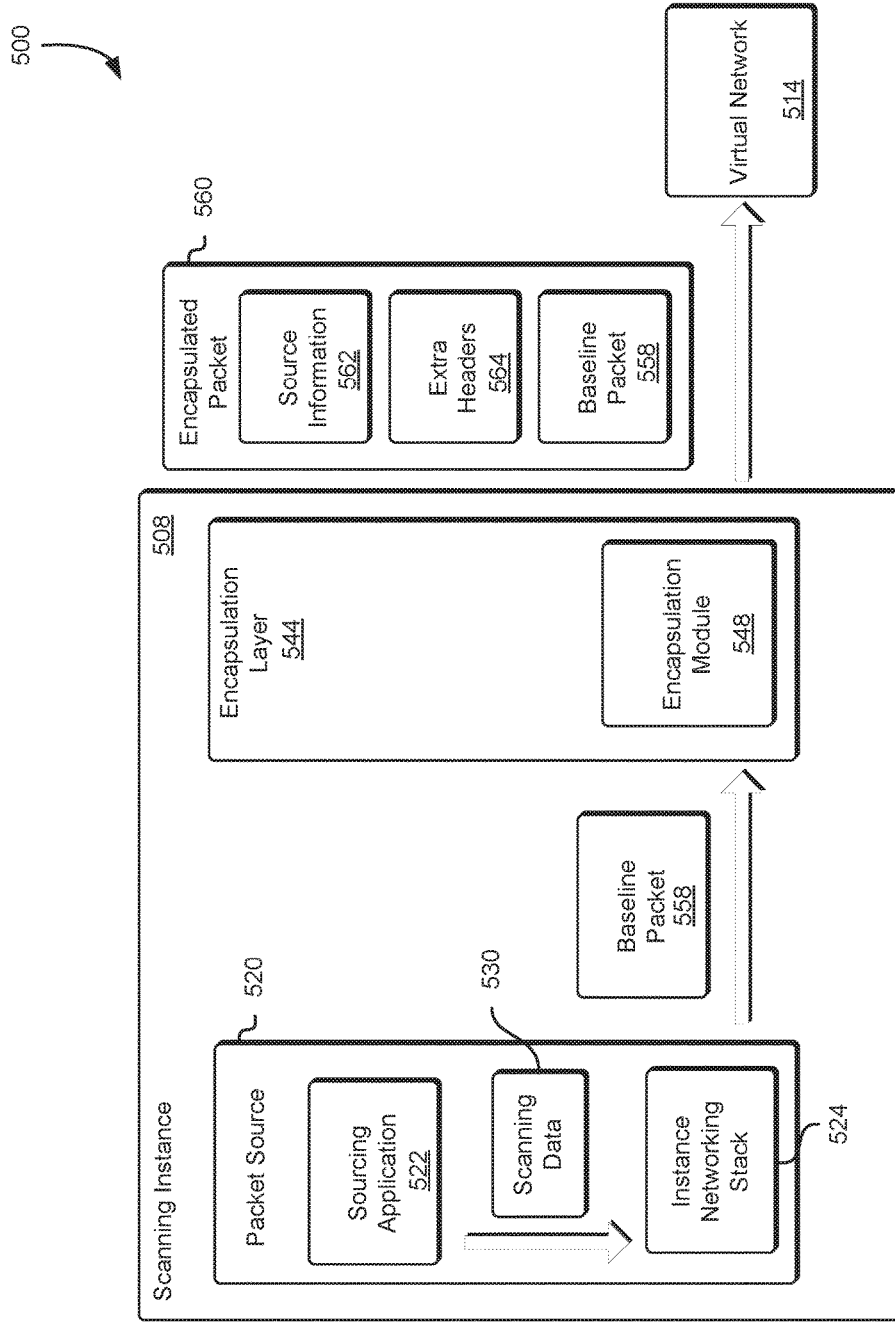
FIG. 5 illustrates an example of components that may participate in an encapsulation technique at a scanning instance to perform network scans from different network locations in accordance with an embodiment.

FIG. 5 illustrates an environment 500 including examples of components that may participate in an encapsulation technique at a network transmission source to execute network scans of a virtual network 514 as described above. As shown in FIG. 5, scanning instances 508 may comprise a packet source 520 and an encapsulation layer 544. A source application 522 may be executed by the packet source 520. The source application 522 may be executable code or other software that executes network scans as described above, for example, utilizing a DPDK platform. The packet source 520 may be a virtual machine, operating system, operating system stub, or other element of executable code supporting the executing of the sourcing application 522 and including an instance networking stack 524. The encapsulation layer 544 may include an encapsulation module 548. In some embodiments, a connection-oriented protocol such as TCP is used between the scanning instance 508 and destination application level components involved (e.g., computing resources within the virtual network 514 such as an endpoint). A TCP connection may first have to be established with a destination instance, e.g., using one or more system calls similar to the socket( ), bind( ), listen( ), accept( ), and/or connect( ) system calls supported in various implementations of the Internet protocol suite's TCP protocol. In other embodiments, a connectionless protocol such as UDP may be used, which may involve the use of a different set of system calls.

When a network scan is to be executed by the sourcing application 522 on some other computing systems or application component located within the virtual network 514, scanning data 530 (e.g., the data to be transferred at the application level) may be passed to the instance networking stack 524 (which may be part of an operating system in use for the computer packet source 520) at the scanning instance 508. The instance networking stack 524 may, in some embodiments, depending on the size of the scanning data 530 and/or the packet size limits of the protocol in use, divide the scanning data 530 into smaller pieces such that each of the pieces can be included within a respective baseline packet 558. The scanning data 530 component may form the body of the baseline packet 558, and a set of headers (such as a TCP header and an IP header, in the case where a TCP connection is being used) generated by the instance networking stack 524 may be included in the baseline packet 558. Headers corresponding to different combinations of layers of the protocol being used may be incorporated within the baseline packet 558 by the instance networking stack 524. For example, if the OSI (Open Systems Interconnect) model is used, a data link layer header may also be included in the baseline packet 558, in addition to a transport layer (e.g., TCP) header and a network layer (e.g., IP) header.

The baseline packet 558 may be transmitted towards a particular destination computer instance within the virtual network 514 by the instance networking stack 524 over a network interface accessible from the scanning instance 508. For example, the baseline packet 558 may be directed to a particular network address of the virtual network 514, which may be assigned to a computing resource. The networking interface may comprise a virtual interface established by the encapsulation layer 544, such that the baseline packet 558 can be intercepted or received by the encapsulating module 548. The encapsulating module 548 may be configured to make several types of decisions regarding the baseline packets 558 of a given transmission. For example, the encapsulating module 548 may determine whether the customer has specified an endpoint or other source of the network scan. In addition, the encapsulating module 548 may determine metadata associated with the network scan, scanning data, virtual network, customer, baseline packet 558, or other component of the network scan to be included in an encapsulated packet 560. For example, the metadata included in the encapsulated packet 560 may enable an endpoint receiving the encapsulated packet 560 to determine a destination within the virtual network 514 for the baseline packet 558 and an address and/or path for returning a response to the baseline packet 558 to the scanning instance 508.

In some embodiments, the encapsulating module 548 is also configured to add additional fields (e.g., an IP header) or values that may be required to ensure that the encapsulation packet 560 reaches the correct destination via the virtual network 514 and/or return from the destination to the correct scanning instance 508 and/or packet source 520. As illustrated in FIG. 5, the encapsulation packet 560 includes the baseline packet 558 as its body, a set of extra headers 564 added for network scanning purposes (e.g., identifying a customer or a particular virtual network 514 of a customer), and source information 562. The source information 562 may be included in the set of extra headers 564 or may be included as a separate set of headers. The encapsulation packet 560 may then be transmitted to the virtual network 514, where a routing component, endpoint, or other computer system may be configured to interpret the values added by the encapsulating module 548 to determine at least a portion of the route (e.g., a network address associated with the baseline packets 558 destination) to be used for the network scan. Depending on the techniques used to determine the added field values, different encapsulation packets 560 of the same transmission may have different field values and may be directed to different computing systems or may direct responses to different computer systems.

Figure 6:
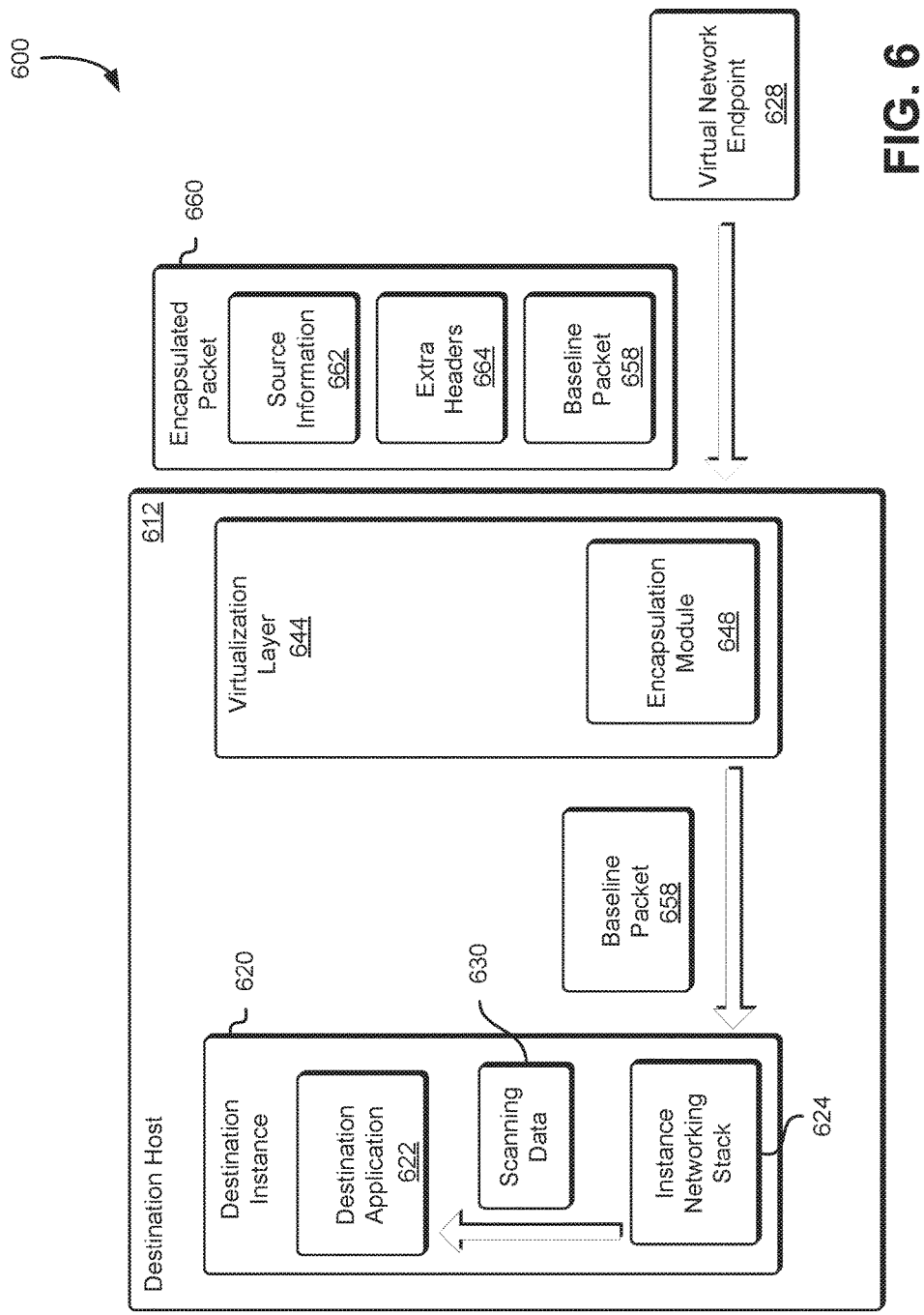
FIG. 6 illustrates an example of components that may participate in an encapsulation technique at a destination of a network scan in accordance with an embodiment.

FIG. 6 illustrates a system 600 which includes examples of components at a destination of a network transmission that may participate in de-encapsulation of scanning packets according to at least some embodiments. As shown, an encapsulation packet 660 may comprise a baseline packet 658 and a set of extra headers 664 added by the encapsulating module at a source (e.g., a scanning instance), and at least some source information 662. The encapsulation packet 660 may be received at an encapsulating module 648 of a destination virtualization layer 644 at host 612 from an interconnected node 610. The receiving encapsulating module 648 may be responsible for extracting the baseline packet 658 from the encapsulation packet 660, e.g., by parsing the encapsulation packet and stripping the extra headers 664. The encapsulation module 648, for the purposes of the present disclosure, may be considered executing outside of the customer context. For example, the customer may operate the destination instance 620 and application within the destination instance 620 such as the destination application 622. However, the computing resource service provider may operate other applications executed by the destination host 612 which are inaccessible to the customer. For example, the destination instance 620 can be a virtual machine executing one or more application, the virtualization layer 644 can also support other applications, such as the encapsulation module, operated by the computing resource service provider and isolated from the customer and thereby outside of the customer context.

A virtual network endpoint 628 may initially receive the encapsulated packet 660 and determine, based at least in part on information included in the encapsulated packet, the destination host 612 and/or destination instance 620 associated with the encapsulated packet 660. In yet other embodiments, the encapsulated packet 660 is transmitted directly to the virtualization layer 644 of the destination host 612 without using the virtual network endpoint 628 as an intermediary, for example, by using a network interface trunk as described above. The encapsulation module 648 may also store the source information 622. Maintaining the source information 662 may enable the encapsulation module 648 to direct responses to the scanning data generated by the destination instance 620 and/or destination application 622 to the appropriate scanning instance as indicated in the encapsulated packet 660.

Figure 7:
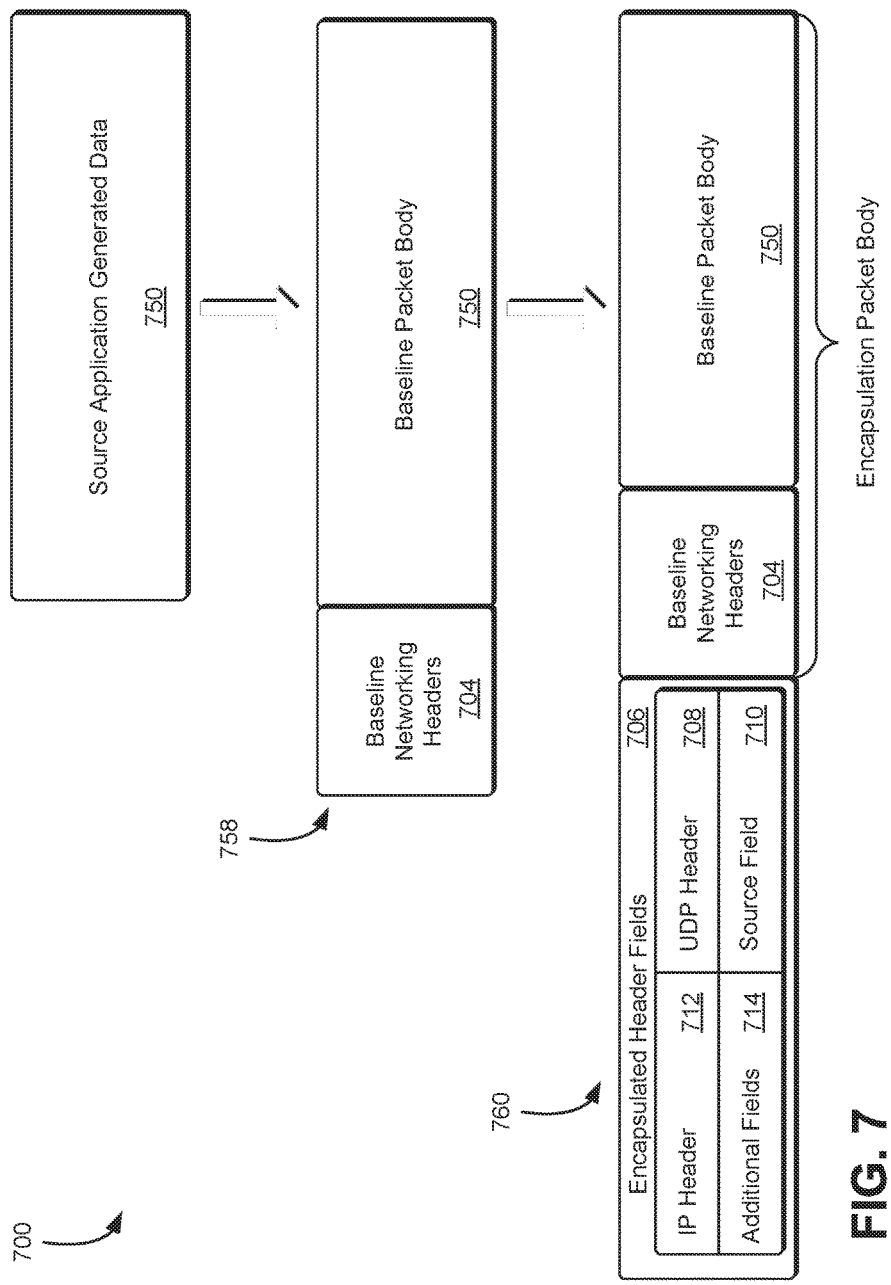
FIG. 7 illustrates example fields that may be added to a scanning packet by an encapsulation module in accordance with an embodiment.

FIG. 7 illustrates an environment 700 in which example fields may be added to a baseline packet by an encapsulation module, according to at least some embodiments. As described above, source application-generated data 750 (e.g., network packets of a network scan) to be transferred to a destination may be organized into one or more body portions 750 of baseline packets 758. Each baseline packet may comprise, in addition to the body portion 750, a set of network protocol headers 704 for one or more layers of a networking stack being used for the transfer from the source networking stack to the destination networking stack. For example, in one embodiment, the protocol headers 704 may include one or more of a transport layer header (such as a TCP header), a network layer header (e.g., an IP header), or a link layer header.

An encapsulation intermediary, such as an encapsulating module, may generate values for one or more additional fields 706 to be added to the baseline packet 758 to form a corresponding encapsulation packet 760. As illustrated in FIG. 7, the additional encapsulation fields 706 may include, for example, an IP header 712, a UDP header 708 or other fields that can be used for hop selection by a routing component, a source field 710 (which may be derived at least in part from headers of the baseline packet in some embodiments, e.g., from the IP header of the baseline packet), and/or other fields 714 used for other aspects of the encapsulation protocol in use. Such additional encapsulation fields 714 may, for example, comprise customer identifiers, network identifiers, scanning instance identifiers, endpoint identifiers, network interface trunk identifiers, monitoring-related information (e.g., tags that can be used to classify packets based on type), and/or billing-related metadata.

For the encapsulation packet 760, the body 758 may comprise the entire baseline packet, including the baseline headers 704, as illustrated in FIG. 7. In some embodiments, not all the values added by the source encapsulation intermediary need be header fields; i.e., some added fields may be included in portions of the encapsulation packet that may be considered part of the body rather than the headers. In yet other embodiments, the encapsulation intermediary may retrieve at least a portion of the information to be included in the encapsulated header fields from an external source. For example, endpoint information provided by the customer may be stored in a database or other storage device. During encapsulation operations the encapsulation intermediary may retrieve the endpoint information and insert the endpoint information in the encapsulated header fields 706. At the destination encapsulation intermediary, the baseline packet may be extracted, and the baseline body may be transferred by the instance networking stack to the destination.

Figure 8:
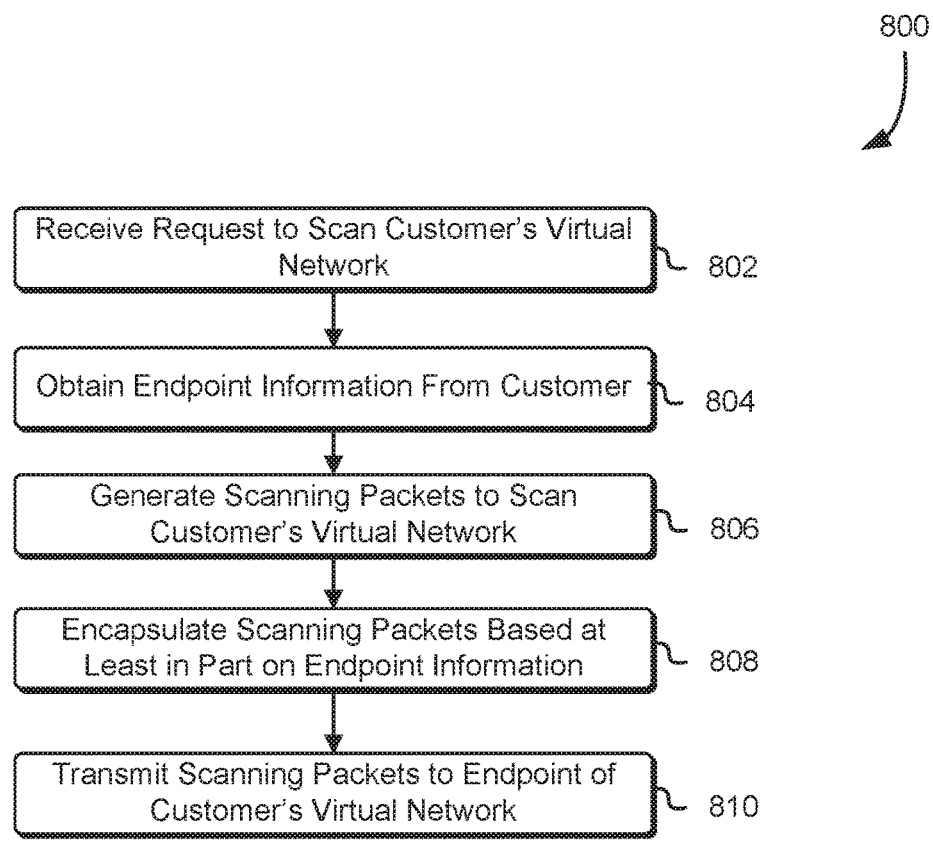
FIG. 8 shows an illustrative process which may be used to execute a network scan in accordance with at least one embodiment.

FIG. 8 is a block diagram illustrating an example of a process 800 for executing a network scan of a virtual network through an endpoint of the virtual network in accordance with at least one embodiment. The process 800 may be performed by any suitable system such as a scanning instance of a scanning fleet as described above in connection with FIGS. 1 and 2. The process 800 includes receiving a request to scan a customer's virtual network 802. The request may be a request to conduct an internal scan of the customer's virtual network. An internal scan of the customer's virtual network may be sourced from or have the appearance of being sourced from within the customer's virtual network (e.g., the network address included in the header is within the customer's virtual network). The network scan may be triggered and/or initiated by the customer or automatically upon the occurrence of an event, which may be specified by the customer, the computing resource service provider, administrator, or other entity. The events may include connecting a new computer system to the virtual network, modifying security devices or policies of the virtual network, expiration of an interval of time, or any other suitable reason for initiating a network scan.

The scanning instance or other computing system implementing the process 800 may then obtain endpoint information from the customer 804. The endpoint information may include a network address, subnetwork, or other information suitable for establishing a communications channel with the endpoint or initialing the endpoint. The information may indicate the customer's virtual network for which a connection is to be established to perform the network scan. As described above, the endpoint may establish a private connection between the scanning instance and the customer's virtual network such that the network traffic generated by the scanning instance is associated with the customer's virtual network. In addition, the endpoint information may be stored by the scanning fleet such that an encapsulation module or other encapsulating intermediary may generate encapsulated headers to include in an encapsulation packet based at least in part on the endpoint information. The scanning instance may then generate scanning packets to scan the customer's virtual network 806. The scanning packets may be network traffic as described above configured to detect computing resources connected to the customer's virtual network and vulnerabilities of the computing resources.

The scanning instance or component thereof, such as an encapsulation module, may then encapsulate the scanning packets based at least in part on the endpoint information 808. Encapsulating the scanning packets may include encapsulating an IPv4 packet in an IPv6 packet as described above. Additionally, encapsulating the packet may identify the customer's virtual network and endpoint such that the encapsulated packets may be directed to the appropriate endpoint in the customer's virtual network as it travels across a computing resource service provider network. The scanning instance may then transmit the scanning packets to the endpoint of the customer's virtual network 810. Transmitting the scanning packets may include transmission of network traffic, including the scanning packets, by a network interface of the scanning instance and may cause the scanning packets to travel over one or more networks.

Figure 9:
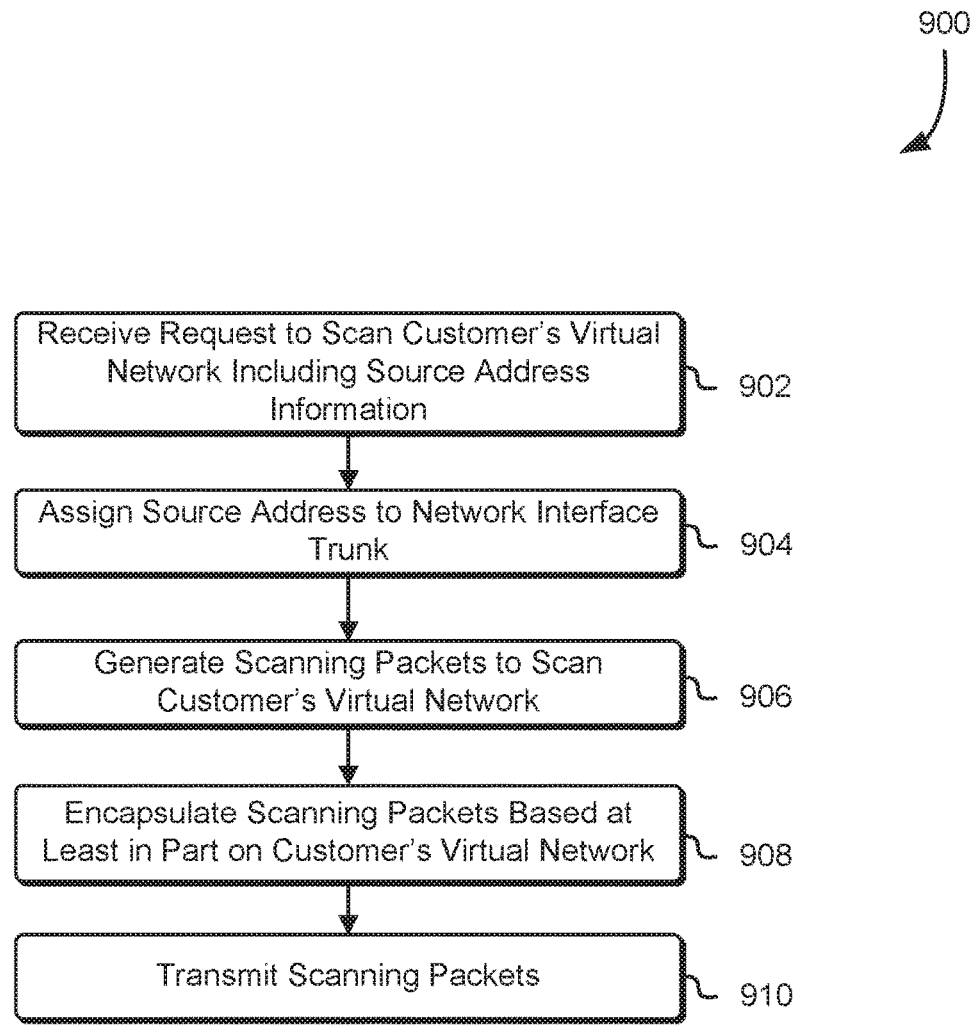
FIG. 9 shows an illustrative process which may be used to execute a network scan in accordance with at least one embodiment.

FIG. 9 is a block diagram illustrating an example of a process 900 for executing a network scan of a virtual network through a network interface trunk in accordance with at least one embodiment. The process 900 may be performed by any suitable system such as a network interface trunk as described above in connection with FIG. 3. The process 900 includes receiving a request to scan a customer's virtual network including source address information. The request to scan a customer's virtual network may be triggered for a variety of reasons as described above in connection with FIG. 9. The source address information may include a network address (e.g., IP address) of the customer's virtual network.

The system performing the process 900 may then assign the source address to a network interface trunk 904. Assigning the network address to the network interface trunk may consume the network address such that other computing resources may not utilize the same network address of the customer's virtual network. The network interface trunk may be a computing system, as described above, configured to operate (e.g., send and receive network traffic) against a large number of separate network addresses. The system performing the process 900 may then generate scanning packets 906 and scan the customer's virtual network. The scanning packets may include network traffic, as described above, configured to detect vulnerabilities in computing resources connected to the customer's virtual network.

The system performing the process 900 or component thereof, such as an encapsulation module, may then encapsulate the scanning packets based at least in part on the customer's virtual network 908. Encapsulating the scanning packets may include encapsulating an IPv4 packet in and IPv6 packet as described above. Additionally, encapsulating the packet may identify the customer's virtual network such that the encapsulated packets may be directed to the appropriate virtual network as it travels across a computing resource service provider network. The system performing the process 900 may then transmit the scanning packets to the customer's virtual network 910. Transmitting the scanning packets may include transmission of the scanning packets as network traffic by a network interface of the system performing the process 900 and may cause the scanning packets to travel over one or more networks.

Figure 10:
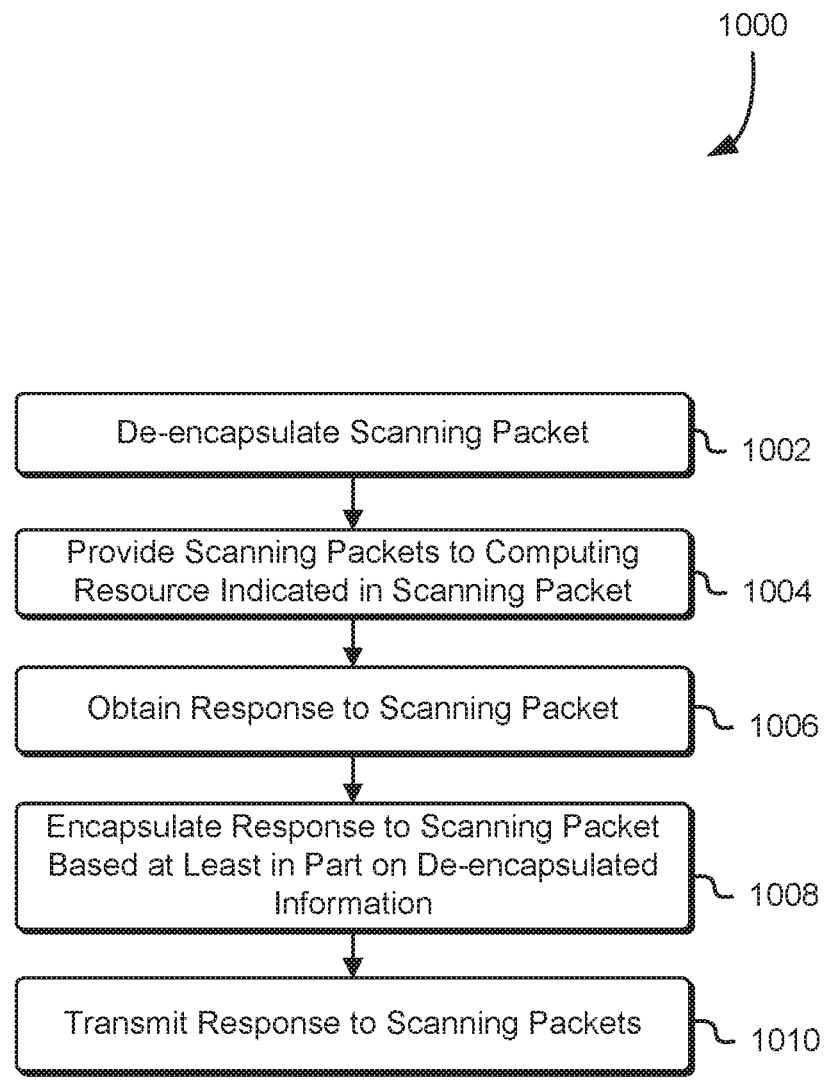
FIG. 10 shows an illustrative process which may be used to execute a network scan in accordance with at least one embodiment.

FIG. 10 is a block diagram illustrating an example of a process 1000 for executing a network scan of a virtual network in accordance with at least one embodiment. The process 1000 may be performed by any suitable system such as computing resources of a customer's virtual network as described above in connection with FIGS. 1-3. The process 1000 includes de-encapsulating one or more scanning packets 1002. The scanning packets may be encapsulated using various techniques described above. In addition, the scanning packets may be received at an endpoint of the customer's virtual network or at a destination indicated with the scanning packets. De-encapsulating the scanning packets may include extracting an IPv4 header and/or packet included in an encapsulated scanning packet.

For example, an encapsulated scanning packet may be received at a virtualization layer of the server computer system as described above. The virtualization layer may obtain the scanning packet by at least de-encapsulating the encapsulated scanning packet and provide the scanning packet to a virtual machine supported by the virtualization layer. In addition, information may be obtained during de-encapsulation of the scanning packet indicating a network address or path to a scanning instance responsible for generating the scanning packet or responsible for collecting responses to the scanning packet.

The system performing process 1000 may then provide the scanning packet to a computing resource indicated in the scanning packet 1004. Returning to the example above, a virtualization layer or networking interface may determine a computing resource (e.g., virtual machine) associated with a network address included in the scanning packet and deliver the scanning packet to the indicated computing resource. The system performing process 1000 may then obtain a response to the scanning packet 1006. For example, if a SYN network scan is being performed the response may include an ACK packet. The response may indicate one or more open ports and a network address of the computing resource. The system performing process 1000 may then encapsulate the response to the scanning packet based at least in part on de-encapsulation information 1008. As described above, during de-encapsulation of the scanning packet information corresponding to the source of the scanning packet (e.g., a scanning instance) may be obtained. The de-encapsulation information may be stored by the system performing the process 1000 or component thereof, such as a virtualization layer, to enable a response to be transmitted to the source of the scanning packet. The system performing the process 1000 may then transmit the response to the scanning instance or other computer system responsible for receiving the response to the scanning packet 1010. Transmitting the response to the scanning packets may include transmission of the response as network traffic by a network interface of the system performing the process 1000 and may cause the response to travel over one or more networks.

Figure 11:
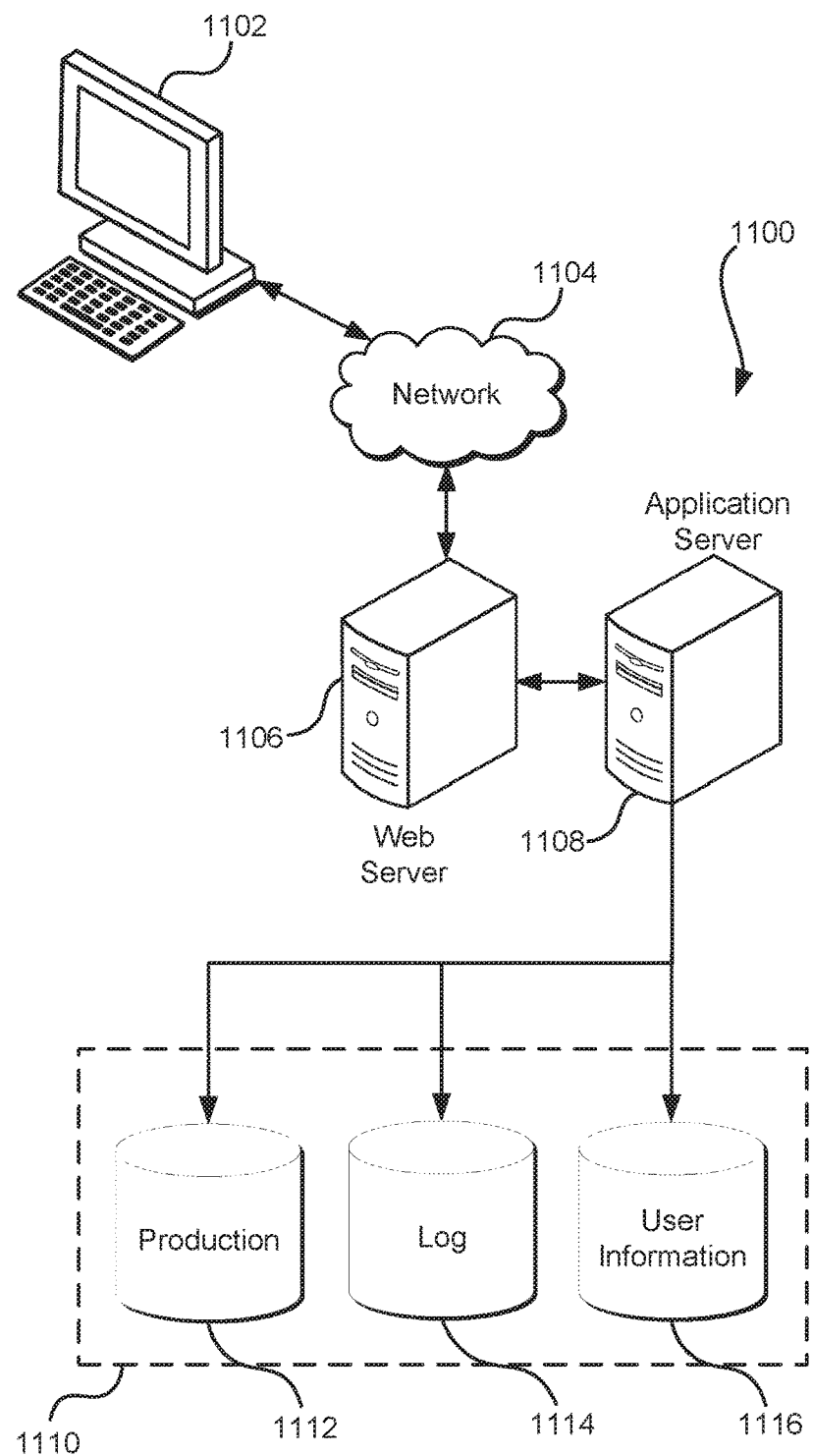
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publiclyaddressable communications network, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including but not limited to text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including but not limited to forms that are perceptible to the user audibly, visually and/or through other senses. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic, or a combination of static and dynamic data in response to the received instructions. Dynamic data, such as data used in web logs (blogs), shopping applications, news services and other such applications, may be generated by server-side structured languages as described herein or may be provided by a content management system ("CMS") operating on or under the control of the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java*, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but, on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on a set of one or more non-transitory computer-readable storage media having stored thereon executable instructions that when executed (i.e., as a result of being executed) by one or more processors of a computer system cause the computer system to perform operations described herein. The set of non-transitory computer-readable storage media may comprise multiple non-transitory computer-readable storage media, and one or more of individual non-transitory storage media or the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining a request to execute a network scan of a virtual network of a plurality of virtual networks operated by a plurality of customers of a computing resource service provider, the request indicating the network scan be internal to the virtual network and the plurality of virtual networks implemented by computing resources provided by the computing resource service provider;
   fulfilling the request by at least generating a scanning packet including network address information corresponding to the virtual network;
   generating an encapsulated packet corresponding to the scanning packet, where the encapsulated packet includes information identifying the virtual network so that the encapsulated packet is routed to the virtual network over a computing resource service provider network;
   transmitting the encapsulated packet to an endpoint of the virtual network, wherein the virtual network responds to the scanning packet as if the scanning packet originated from the endpoint and is addressable from within the virtual network;
   de-encapsulating the scanning packet from the encapsulated packet; and
   delivering the scanning packet to a destination within the virtual network based at least in part on network address information included in the scanning packet.

2. The computer-implemented method of claim 1, wherein generating the scanning packet further comprises assigning a local network address of the virtual network to a network interface trunk and including the local network address in a header of the scanning packet, where the local network address is determined by the computing resource service provider and the network interface trunk is connected to the virtual network and at least one other virtual network of the plurality of virtual networks.

3. The computer-implemented method of claim 1, wherein the computer-implemented method further comprises:
   obtaining a response from the destination by at least transmitting the response to a source of the scanning packet indicated in the encapsulated packet; and
   analyzing the response to generate network scan information.

4. A system, comprising:
   one or more processors; and
   memory that includes instructions that, when executed by the one or more processors, cause the system to:
   execute an internal scan of a virtual network by at least:
   generating a set of packets directed to a destination within an address space of the virtual network;
   encapsulating the set of packets to generate a set of encapsulated packets, the set of encapsulated packets including additional information to cause one or more routing devices to direct encapsulated packets of the set of encapsulated packets to the virtual network over one or more other networks; and
   transmitting the set of encapsulated packets to an endpoint of the virtual network, wherein the virtual network responds to a packet in the set of packets as if the packet originated from the endpoint and the packet has an address from within the virtual network; and
   obtain, from the destination, a set of responses to the set of packets.

5. The system of claim 4, wherein the virtual network is one of a plurality of virtual networks implemented using computing resources of a computing resource service provider and the plurality of virtual networks are operated by customers of the computing resource service provider.

6. The system of claim 4, wherein the additional information further comprises routing information to enable the destination to generate the set of responses such that the set of responses are routed to the system.

7. The system of claim 4, wherein the memory further includes instructions that, when executed by the one or more processors, cause the system to obtain, from a customer, information associated with the address space of the virtual network as a result of an event triggering the internal scan of the virtual network.

8. The system of claim 4, wherein the memory further includes instructions that, when executed by the one or more processors, cause the system to obtain, from storage prior to executing the internal scan of the virtual network, information associated with the address space of the virtual network.

9. The system of claim 4, wherein the memory further includes instructions that, when executed by the one or more processors, cause the system to:
   obtain information associated with a local network address of the virtual network; and
   assign the local network address to a network interface trunk.

10. The system of claim 4, wherein the memory further includes instructions that, when executed by the one or more processors, cause the system to provide, through a user interface, a result of the internal scan of the virtual network to a customer based at least in part on the set of responses.

11. The system of claim 7, wherein the memory further includes instructions that, when executed by the one or more processors, cause the system to:
   provide information associated with the address space of the virtual network to a module, where the module is executed outside of a customer context on the system; and
   wherein encapsulating the set of packets to generate the set of encapsulated packets is performed by the module.

12. A set of one or more non-transitory computer-readable storage media having stored thereon executable instructions that, as a result of being executed by one or more processors of a computer system, cause the computer system to:
   obtain a request to execute a network scan of a virtual network;
   generate a plurality of packets including address information associated with the virtual network;

generate a set of encapsulated packets for at least a portion of the plurality of packets including destination information for the virtual network across one or more other networks;

transmit the set of encapsulated packets across the one or more other networks;

obtain, from an encapsulated packet of the set of encapsulated packets, a scanning packet of the plurality of packets including a destination within the virtual network;

deliver the scanning packet to the destination within the virtual network, wherein devices in the virtual network respond to the scanning packet as if the scanning packet originated from the destination and the scanning packet has an address from within the virtual network; and detect, based at least in part on a response to the scanning packet, a computing resource on the virtual network.

13. The set of one or more non-transitory computer-readable storage media of claim 12, wherein the instructions that cause the computer system to transmit the set of encapsulated packets across the one or more other networks further include instructions that cause the computer system to transmit the set of encapsulated packets to an endpoint associated with the virtual network.

14. The set of one or more non-transitory computer-readable storage media of claim 13, wherein the instructions that cause the computer system to transmit the set of encapsulated packets to the endpoint associated with the virtual network further include instructions that cause the computer system to modify the set of encapsulated packets to include routing information to enable the destination to transmit a response to the computer system.

15. The set of one or more non-transitory computer-readable storage media of claim 13, wherein the instructions further comprise instructions that, as a result of being executed by the one or more processors, cause the computer system to obtain information associated with the endpoint prior to generating the set of encapsulated packets.

16. The set of one or more non-transitory computer-readable storage media of claim 12, wherein the instructions that cause the computer system to transmit the set of encapsulated packets across the one or more other networks further include instructions that cause the computer system to transmit the set of encapsulated packets from a network interface trunk assigned a network address within an address space of the virtual network.

17. The set of one or more non-transitory computer-readable storage media of claim 12, wherein the instructions that cause the computer system to generate the set of encapsulated packets further include instructions that cause the computer system to generate, for each encapsulated packet of the set of encapsulated packets, an encapsulated header indicating a location to which the response to the plurality of packets is directed.

18. The set of one or more non-transitory computer-readable storage media of claim 12, wherein the instructions that cause the computer system to obtain the packet of the plurality of packets further include instructions that cause the computer system to de-encapsulate the encapsulated packet prior to delivering the packet to the destination.

19. The set of one or more non-transitory computer-readable storage media of claim 18, wherein the instructions that cause the computer system to de-encapsulate the encapsulated packet further include instructions that cause the computer system to store information from a header of the encapsulated packet indicating that a scanning instance is to receive responses to the packet from the destination.

20. The computer-implemented method of claim 1, wherein the computer-implemented method further comprises detecting, based at least in part on a response to the scanning packet, a computing resource on the virtual network.

* * * * *